S. R. KROM.
Ore Separator.

Patented April 7, 1868.

Witnesses:
J. D. Stetson
R. C. Livings

Inventor:
S R Krom

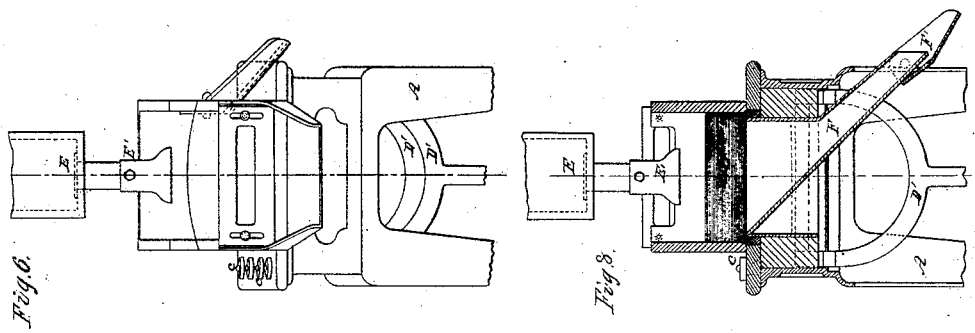
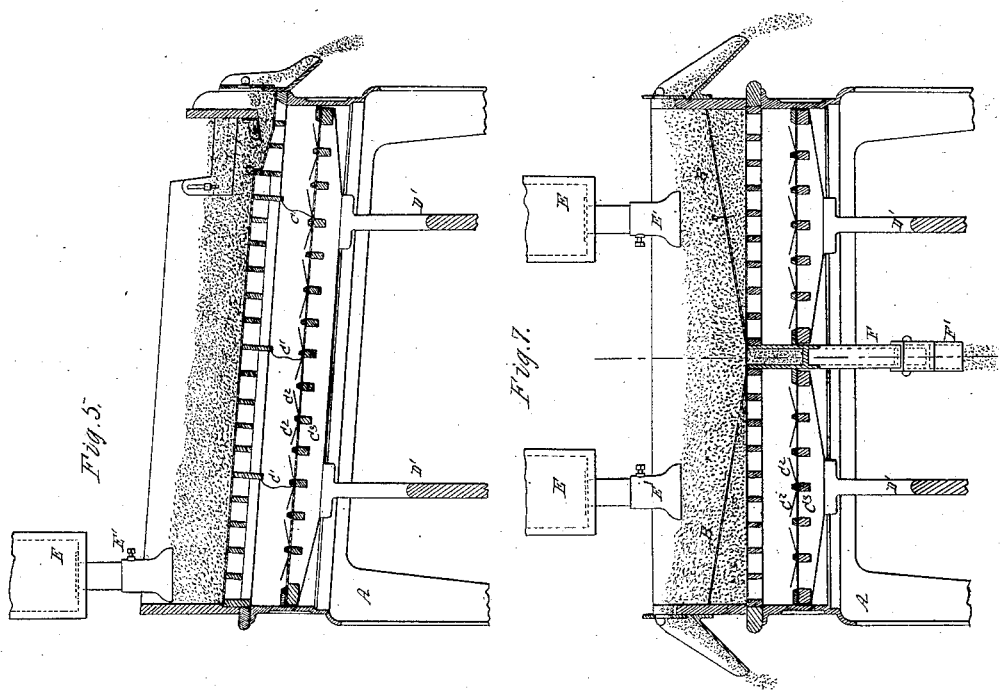

United States Patent Office.

STEPHEN R. KROM, OF NEW YORK, N. Y.

Letters Patent No. 76,331, dated April 7, 1868.

---

IMPROVED APPARATUS FOR SEPARATING ORES AND MINERALS.

---

The Schedule referred to in these Letters Patent and making part of the same.

---

TO ALL WHOM IT MAY CONCERN:

Be it known that I, STEPHEN R. KROM, of the city of New York, county of New York, and State of New York, have invented certain new and useful "Improvements in Means or Apparatus for Separating Granular Ores and other Material having Different Specific Gravities;" and I do hereby declare that the following is a full and exact description thereof, reference being had to the accompanying drawings, which form a part of this specification.

This invention relates, in part, to the construction and arrangement of that class of machines in which intermittent jets or puffs of air or other fluid are projected through a perforated bottom or sieve, on which the materials lie, so as to loosen and agitate the mass in a manner which has been found to be peculiarly favorable for separating lighter from heavier grains, carrying the lighter to the top and allowing the heavier to sink to the bottom of the stratum.

This invention consists, firstly, in providing in a separating-machine, having the grains separated by the intermittent action of air or other fluid, as below described, a certain peculiarly-arranged passage to discharge the lower or heavier stratum of material; secondly, in providing, in such a machine, a narrow gate or apron, at the mouth of such passage, for better preventing the entrance of tailings or light material therein; thirdly, in providing, in such machine, a shoe or spout, at the discharge-end of such passage, for better regulating the flow of material from such passage; fourthly, in providing, in such machine, certain valves, to allow the escape of air or analogous fluid when the action is too strong; fifthly, in placing, in such machine, the blowing means, directly under and near to the ore-bed, and maintaining its close action with variable lengths of stroke; sixthly, in the use of a peculiar construction of bellows, in such machine, whereby I obtain a very free induction for the air or other fluid; seventhly, in the employment, in such machine, of a cam-motion for the bellows, so as to open slowly and shut quickly; eighthly, in certain means of casing a portion of the machinery, in such machine, to protect it.

Figs. 1 to 8, inclusive, represent machines constructed according to that part of my invention which employs intermittent jets.

Figure 5 is a longitudinal section through a machine, showing a modification of the form shown in figs. 1, 2, 3, and 4.

Figure 6 is an end view of the same.

Figure 7 is a longitudinal section through a machine, showing further modifications of my invention.

Figure 8 is a cross-section of the same.

Figure 3:
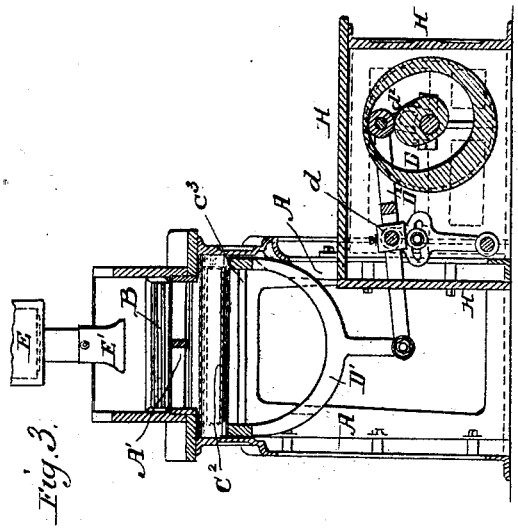
Figure 3 is a transverse section.

A is a frame, made of iron, which supports or carries the several parts. A' is a lattice-frame, of wood, over which is tightly drawn a fine-wire sieve, B, on which the ore to be treated is placed. C is a piston-bellows, so constructed as to render it very strong, and admit the free passage of air through it, the operation of which will be hereafter described. D is a cam-wheel, connected to and operating the bellows by means of pitmen $D^1$ and levers $D^2$, said cam-wheel being constructed so as to give a quick upward movement of the piston, said piston moving up in one-quarter and down in three-quarters of each revolution of the wheel, thus giving more force or velocity to the piston, and allowing more time for the bellows to fill in its downward movement. At each upward movement of the piston, the air above it is suddenly forced through the ore lying on the bed or fine sieve B, and causing a partial separation of the ore, or heavier particles from the lighter, the lighter particles will be thrown to the top, while the heavier will remain at the bottom. Each puff of air continues to more divide or separate the particles until an entire separation is attained.

A hopper, E, provided with a sliding tube, E', placed over the upper end of the machine, is for feeding the machine with material to be operated upon. Placing the mouth of said tube nearer to or further from the sieve regulates the rapid or slow flow of material. When the machine is in motion, the ore on the bed is constantly moving forward or downward, so that just as fast as the ore is removed from the mouth of the feeding-tube it will be replaced by more pressing closely after it. In this way the machine is fed uniformly, or just equal to the rapidity with which the ore is discharged at the lower end of the machine. The ore on entering the machine through the tube E', at the upper end, is equally mixed with quartz, or other lighter materials, as is represented by red and black dots shown in the drawings; but the action of the air on the mass in rapid successive puffs tends to lift the lighter particles to the surface, and also to move the whole mass forward or down the incline, as before mentioned, so that the farther the ore advances the more perfect becomes the separation, until finally, at the lower end of the machine, perfect separation has taken place, and we, at this point, provide suitable channels for the escape of the lower stratum, and an overflow for the upper or lighter stratum.

At the lower end of the discharge, F, for the pure ore, is placed a shoe, F', by means of which I regulate the discharge of the metal. The said shoe is hung on pivots, $f\ f$, and may be raised or lowered at various angles with the spout or discharge, thereby checking or retarding the flow of metal.

Figure 1:
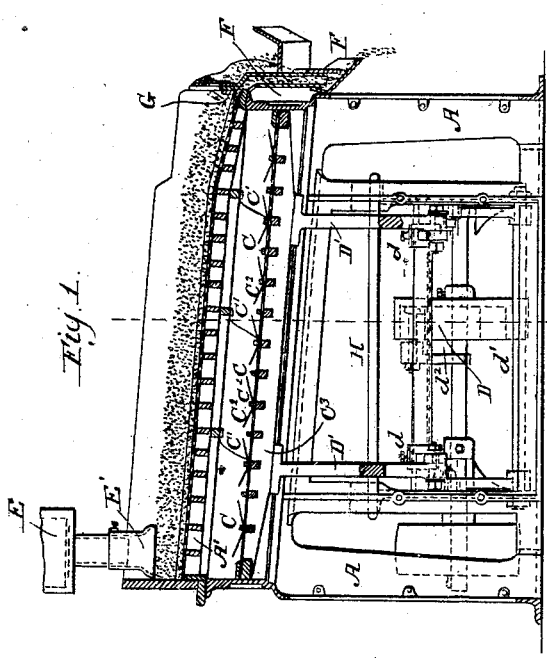
Figure 1 is a longitudinal central section through one form of my machine.
Figure 4:
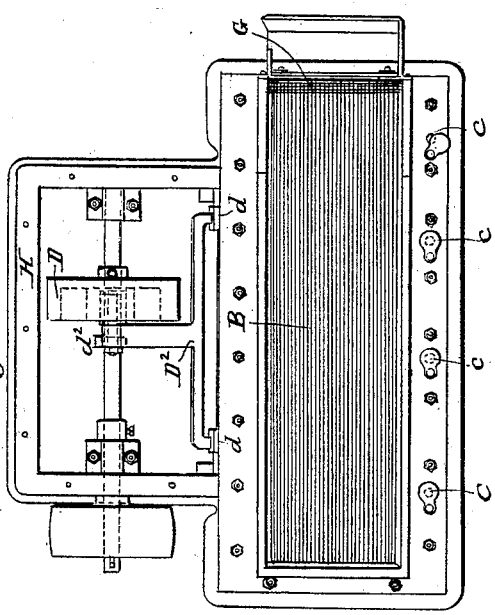
Figure 4 is a plan view.

At the point where the ore leaves the bed and enters the perpendicular discharge or spout, is placed a narrow wire apron, G, represented in figs. 1, 4, and 5. The object of this apron is to prevent any tailings or refuse material from working down at the end of the machine, and mixing with the pure ore; this is necessary on account of the tendency of the quartz or lighter material to mingle with the ore at the edges of the sieve. The overflow for tailings or refuse material is provided with a gate to regulate their discharge, and also the depth of the mass lying at the lower end of the bed.

Next to producing a quick, upward movement of the bellows, is to place it as near the sieve as possible. By this means I get a more vigorous pulsation or action on the ore than I do when the blowing-device is farther removed. For example, let us suppose we wish to move the blowing-device upward two inches, and we have a two-inch air-chamber above the bellows, then the pressure will be increased, but if we reduce the air-chamber to one-half inch, then the pressure will be still greater. By placing the bellows near enables me to use a shorter stroke and produce the same effect on the ore, also producing a more vigorous action or pulsation, which is so essential, and which I do not get when the bellows act through a greater distance. A long action of bellows tends to produce an easy lifting action on the ore, but it is a vital point that it should be short and sudden.

Since all ores are not of the same gravity, some will require greater force of air to lift them than others. I therefore provide means to lengthen or shorten the action of the blowing-device by using a swinging fulcrum, $d$. This fulcrum may be moved on the levers $D^2$ at will. When the levers $D^2$ are lengthened, by throwing back the fulcrum $d$, the motion of the bellows is increased in the same proportion which would cause the bellows to strike the bed which supports the sieve. To avoid this, I hang the fulcra $d$ on a shaft, $d^1$, by which they are rigidly held in line, so that when the said fulcra swing backward towards the cam, they fall below their original height, and thus compensate for the longer or shorter stroke of the bellows. In this way I am enabled to keep the bellows close to the sieve, whatever may be the length of the stroke. Boxes sliding on an angle would be a perfect method of accomplishing this movement, but the above-described method is so nearly perfect that I prefer to use it on account of its simplicity. The yoke, $d^2$, is for the purpose of holding the cam-roller and attached parts in position.

The bellows are provided with partitions, $C^1$, of leather, or other flexible material, represented in figs. 1 and 5, (I do not limit myself to any particular number.) The object is to confine the air between the walls of the said partitions, and to carry it directly upward over each section of bellows. By the aid of these partitions and valves $C^2$, fig. 1, I am enabled to produce the desired effect on the ore directly over each section or division of bellows. This is necessary on account of the increasing density of the mass as it approaches the lower end of the machine, clearly represented by red and black dots. It will, therefore, be seen that it requires a stronger puff of air to agitate the mass lying on the bed at the lower end of the machine than to agitate that lying on the upper end. To produce this effect, I provide each section of the bellows with an escape-valve, $e$, fig. 4, and by this means graduate the force of air required to agitate the mass over each respective section. The one at the upper end will be open and allow a greater escape than the one next to it, and so on in regular succession.

The bellows before mentioned is constructed as follows: $C^3$ is the main support, which carries the cross-bars, which, in turn, carry a coarse-wire sieve, which acts as a support for the valves $C^2$, the said wire not only making a good support for the valves, which are of leather or other flexible material, but it also admits of a free passage of air into the bellows, which is necessary on account of its rapid movement.

Machinery of this class is subject to much wear on account of the sand, grit, dust, &c., connected with the operation of concentrating any kinds of earthy matter, getting into the journals of the machine. To prevent this, I enclose the running-gear in a box, H, so that it is subject only to the ordinary wear of machinery. The only place where the dust can enter the closed box H is through the openings where the levers $D^2$ pass. These I close by means of a bag, fastened securely around the openings, and tied to the moving parts outside, thus forming a flexible joint. It can be attached to the levers $D^2$, as represented, or extended still further out and made to enclose the joint at the end of that lever.

Figure 2:
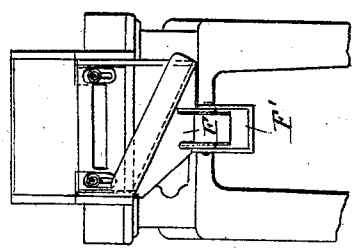
Figure 2 is an end elevation.

A modification of my machine is represented in figs. 7 and 8. The difference consists in the form of the bed on which the ore lies and the place for delivery. In most cases I consider this the best. I here incline the bed from each end toward the centre of the machine, and it delivers the ore at this point through a spout, F, in the same manner as described in fig. 1. The tailings are carried over the end of the machine, as described in figs. 1 and 2. Below the inclined beds are placed straight beds. The space between these is filled with the same kind of material as that to be treated on the upper bed. By this means I equalize the force of the blast on the mass lying on the inclined beds. If it were not for this filling, air would escape at the upper end of the bed, where the ore lies in a thinner stratum, without producing any effect upon that which lies in a thicker stratum at the lower end. While I consider this the best form to make the upper bed, it is not essential to perfect concentration. I find that a perfectly straight bed works well enough for practical purposes. I prefer to make them both ways, as circumstances may require.

The advantages of the form represented in fig. 7 over that represented in fig. 1, are, that the ore in fig. 1, if fed too fast, is liable to work down and be forced over the overflow for tailings; but in the form represented in fig. 7, it will be seen that the metal or pure ore tends in the opposite direction to the tailings.

In the form shown in fig. 1, I can separate all ordinary matters with a considerably less length of the inclined perforated bed than is represented. I can operate the machine very successfully by feeding the material on to the middle of the bed here represented, thus using only half the length of the bed. I propose, in practice, to make the machine in some instances double, that is to say, to make the feed-spout and its appurtenances of a capacity sufficient to supply twice the quantity of ore or granular substance, and to place it over the middle of the perforated bed B, and to cause the bed to incline from that point towards both ends of the machine, and to provide similar discharging-apparatus, F F', G, &c., at each end. In such case, I can make the bellows C and its appurtenances correspondingly incline in both directions. I have operated the machine in this double form very successfully with the bellows C perfectly level. The double machine treats about twice the quantity in the same time as a single machine, and requires only a single set of the blowing and the feeding-devices.

I am aware that the blowing up through perforated beds, with various means of disposing of the materials thereby separated according to their gravities, has been before known. I would especially disclaim all that is described in the several patents issued to Thomas J. Chubb, dated, respectively, August 25, September 1, and October 13, 1857; but having now fully described my invention, with what I consider the best means of carrying it out,

What I claim as new, and desire to secure by Letters Patent, is as follows:

1. I claim, in machines for separating granular materials of different densities by the aid of intermittent jets of air or other fluid, the passage F, to discharge the lower stratum, either from an inclined or level bed of a double or single machine, as herein described.

2. I claim, in such machine, the small apron G, at the lower discharge, as described.

3. I claim, in such machine, the shoe F', at the lower end of the lower discharge, as described.

4. I claim, in such machine, the escape-valves $c\ c$, for the purpose described.

5. I claim, in such machine, the blowing means, or its equivalents, situated close to the material, in combination with the within-described manner of maintaining its proximity under various changes of stroke, for the purpose described.

6. I claim the bellows C, having a series of flaps $C^2$, covering nearly the whole open-work or perforated surface, as shown in figs. 1, 5, and 7.

7. I claim, in such machine, the cam-wheel D, constructed and arranged relatively to the lever $D^2$ and its connections, as and for the purpose described.

8. I claim, in such machine, the closed box H, constructed and arranged relatively to the enclosed and connected parts, substantially as and for the purpose herein described.

S. R. KROM.

Witnesses:
   T. D. STETSON,
   C. C. LIVINGS.